United States Patent [19]

Vansickle

[11] 4,079,996
[45] Mar. 21, 1978

[54] TRAILER VEHICLE FOR HAULING LARGE CYLINDRICAL BALES OF HAY

[76] Inventor: Julius D. Vansickle, Rte. 3, Boswell, Okla. 74727

[21] Appl. No.: 758,000

[22] Filed: Jan. 10, 1977

[51] Int. Cl.² .............................................. B60P 1/28
[52] U.S. Cl. ................................. 298/8 R; 298/18; 298/38
[58] Field of Search ............... 214/501, 505, DIG. 1, 214/DIG. 3, DIG. 4; 296/6, 8; 298/8 R, 18, 38

[56] References Cited

U.S. PATENT DOCUMENTS

| | | | |
|---|---|---|---|
| 2,728,602 | 12/1955 | Casey et al. | 214/505 X |
| 3,922,036 | 11/1975 | Kalsbeck et al. | 298/18 |

*Primary Examiner*—Robert G. Sheridan

*Attorney, Agent, or Firm*—Head, Johnson & Chafin

[57] ABSTRACT

A trailer vehicle for hauling large cylindrical bales of hay comprises an elongated rectangular frame supported on an axle and wheels. The frame carries a plurality of rectangular frames in which the transverse members are curved in the form of an arc to match that of the bales of hay. The support frames are hinged about a longitudinal axis on sloping transverse support members which are a part of the vehicle frame. In the loaded and traveling position, the support frames are horizontal and are latched to the support members. When the bales are to be unloaded the latch is opening manually and the support frame can then tilt to the side permitting the bale to roll off of the support frame and onto the ground.

4 Claims, 6 Drawing Figures

TRAILER VEHICLE FOR HAULING LARGE CYLINDRICAL BALES OF HAY

BACKGROUND OF THE INVENTION

This invention lies in the field of hay bale carriers generally. More specifically it concerns a carrier vehicle for carrying a plurality of large cylindrical bales of hay that can be unloaded without hydraulic or winch power.

In the prior art, there have been a number of designs shown for hay bale carrier vehicles. However, none of them show the advantage of a rocking support frame such that when the bale is loaded on the vehicle it can be locked in a horizontal position whereas when it is desired to unload the bale the latch can be open and the support frame tilted to permit the unloading.

SUMMARY OF THE INVENTION

It is a primary object of this invention to provide a cylindrical hay bale carrier vehicle, that has a plurality of support frames, arranged on the longitudinal rectangular frame of the vehicle, having at least one axle and wheels. The support frames are rectangular in plan view and are curved to fit the contour of the bale so that when the frames are horizontal the bale is sitting within a cupped frame, and is prevented from rolling out of the frame. The frame is supported along a longitudinal axis at its center point, so that when the frame is horizontal there is no tendency for the bale and frame to roll to the side. There is a latching mechanism that holds the frame in a horizontal position. When it is desired to unload the bale, the latches are open and a side push on the bale will cause the frame to rotate about its longitudinal axis, so that the bale can then roll out of the support frame and onto the ground.

These and other objects are realized and the limitations of the prior art are overcome in this invention by providing a long rectangular framed vehicle, which is supported on at least one axle and wheels. It is drawn as a trailer behind a truck in a conventional manner. By removing the wheels and axle the frame can be installed on top of a truck or trailer. The frame comprises two longitudinal rails one of which is made of square tubing comprising two steel angles welded longitudinally. The other frame comprises a single angle.

The stronger frame member is on a first side of frame, in the direction to which the support frame tilts. The extra strength is needed since while the bale is being loaded or unloaded the full weight of the bale is on the longitudinal member on the first side. At other times, the weight is carried equally by the two rails.

A support structure is attached to the frame having a plurality of sloping transverse support members, which are attached to the square tubing (or first) side of the frame and slops upwardly to be supported on top of a plurality of short columns on the second side of the frame. A subsidiary frame member is welded to the tops of these support columns and at the point of attachment at the support members.

There are one or a plurality of support frames, which are rectangular in shape, with the transverse members formed in the arc of a circle, adapted to fit the curvature of the bale, that will sit on the frame. The frames are attached to the transverse support members of the vehicle along a longitudinal axis at the centers of the frames. Latching means are provided to lock the frame in a horizontal position. When the bale is carried on the frame and the frame is latched in a horizontal position the bale is secured by the curvature of frame. When it is desired to unload the bale, the latch is opened and a push to the side will permit the support frame to rotate about its centerline axis, and thus to permit the bale to roll out of the curved form of the support frame onto the ground.

BRIEF DESCRIPTION OF THE DRAWINGS

These and other objects and advantages of this invention and a better understanding of the principles and details of the invention will be evident from the following description taken in conjunction with the appended drawings in which:

FIG. 3 represents the situation when the support frame is horizontal and latched and; FIG. 4 illustrates the case where the latch is open and the frame is tilted.

DESCRIPTION OF THE PREFERRED EMBODIMENT

Figure 1:
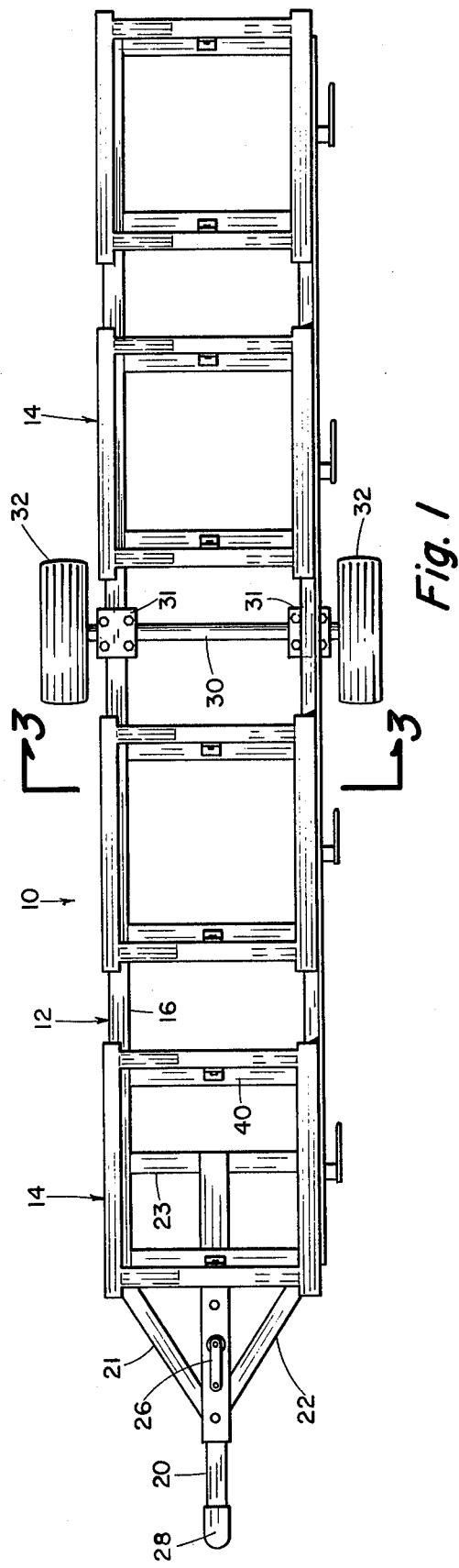
FIGS. 1 and 2 illustrate in plan view and elevation, one embodiment of this invention.
Figure 2:
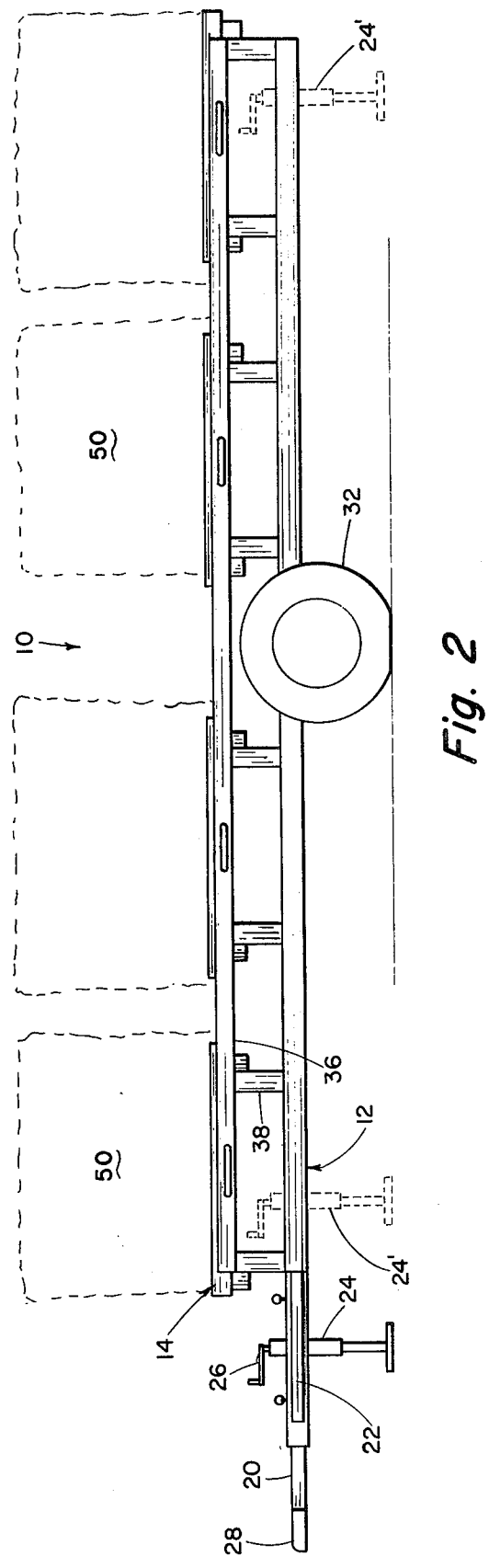

Referring now to the drawings, FIGS. 1 and 2 show respectively in plan and elevation one embodiment of this invention. Numeral 10 indicates generally the entire structure of the invention. Numeral 12 indicates generally a long rectangular framework which is supported on axle 30 and wheels 32. On this framework, there are a plurality of support frame assemblies, indicated generally by the numeral 14.

The frame as indicated in FIGS. 1, 2, 3 and 4 comprises two spaced parallel longitudinal members, a member 16 which is composed of a heavy duty square tubing, which is preferably constructed from two heavy duty steel angle members, which are welded in the form of a square tubing. The other longitudinal member 18 of the frame 12 is a heavy duty steel angle member, such as comprises one-half of the square tubing 16. There are a plurality of cross members to the frame to give it stability and also for angular rigidity.

The long member on the first side of the trailer frame (the side to which the carrier frame tilts) is made stronger than the second member since while a bale is being loaded and unloaded the full weight of the bale is supported by that single member.

A transverse axle 30 is clamped to the frame member 16 and 18 by means of U bolts 34, which are held in place by steel plates 31 and nuts, in the conventional manner. The tire and wheel assemblies are indicated by the numeral 32, although detailed description is not required. The frame can also be used without wheels by mounting it on top of a truck or trailer. While FIGS. 1 and 2 show a long frame with four carrier frames, it will be clear that frame 12 can be made shorter or longer to suit the vehicle. Also two frames 12 can be set side by side on a truck for example, with all carrier frames tilting outwardly, the latches being on the inside.

There are a plurality of rectangular support frames indicated generally by the numeral 14. These comprise longitudinal angle members 42 and transverse members 44 which are welded into a rectangular frame. The transverse members are formed generally in the form of an arc, of a radius corresponding to that of the bale 50 which will be carried in the frame.

There are a plurality of sloping transverse support members 40 which are welded at one end to the square tubing longitudinal member 16 on the first side of the frame, and at the other end are welded to the top of short columns 38, which are welded to the longitudinal frame member 18 and to a top angle member 36 at the second side. At the center of the sloping support member 40 is an angle 46, and a bolt 48 passes through the angle and through the center of the transverse member 44 of the support frame. Thus, the support frame 14 is held along its central axis by means of the bolts 48, which permit it to rotate from a horizontal position as shown in FIG. 3 to a sloping position as shown in FIG. 4.

Figure 3:
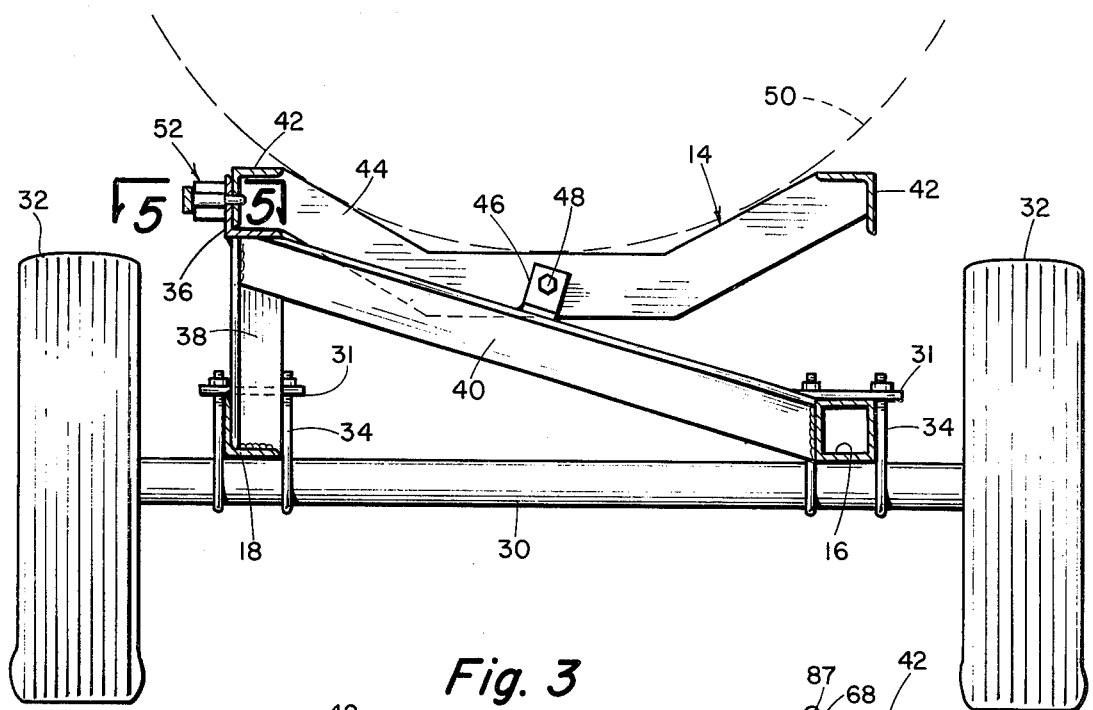
FIGS. 3 and 4 represent cross-sectional views of FIG. 1 taken along the plane 3—3.
Figure 4:
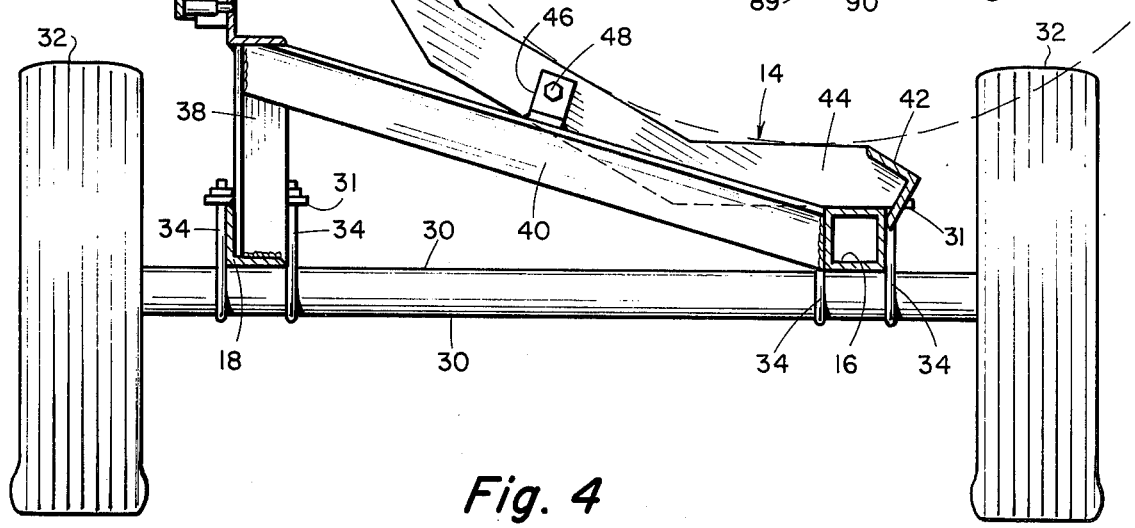
Figure 5:
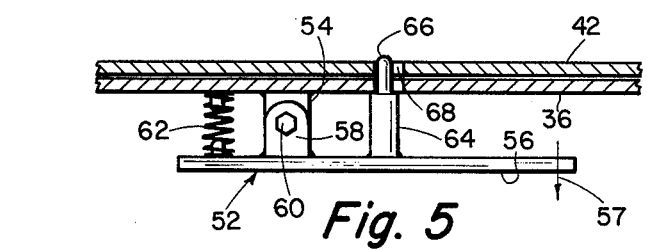
FIG. 5 illustrates one embodiment of a latch for locking the support frame.

In the position of FIG. 3 when the frame is horizontal, a latch is provided along the longitudinal angle 36, which is detailed in FIG. 5.

In FIG. 5, there is shown a view of the latching mechanism taken along plane 5—5 of FIG. 3. This shows sections through the two longitudinal angles 36 of the vehicle frame, and 42 of the support frame. Attached to the longitudinal angle 36 is a strap 54 which is bolted by means 60 to another strap 58 which is attached to an arm 56. A spring 62 is attached between the arm 56 and the angle 36 such that the arm 56 is moved in the direction toward the angle 36. A post 64 with a pin 66 is welded to the inside surface of the arm 56 and projects through an opening 68 through the webbs of the two angles 36 and 42. Thus when the arm is in the position shown, due to the force of the spring 62, the pin 66 locks the frame 14 in its horizontal position as shown in FIG. 3. When the arm 56 is moved in the direction of the arrow 57, the pin is withdrawn from the opening 68 permitting the frame 14 to rotate in a clockwise direction and to dump the bale over the member 42 and onto the ground.

Figure 6:
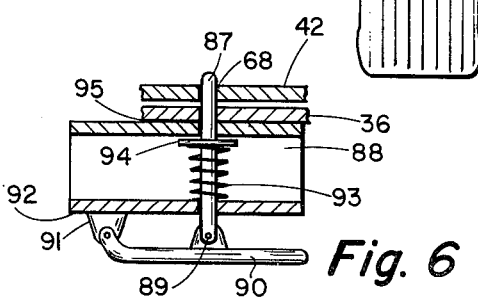
FIG. 6 illustrates a second embodiment of a latch for locking the support frame.

In FIG. 6 is shown a second embodiment of a latch. Shown are the angles 42, 36 with the opening 68. A length of square tubing 88 is welded 95 to angle 36. The opening 68 continues through the tubing 88. A long pin 87 which passes through the opening 68 is pivoted to the arm 90 at 89. The arm 90 carries a roller 91 which rolls on the surface 92 of the tubing 88. Pin 94 and spring 93 cause the pin 87 to be extended except when the arm 90 is pulled.

In loading the trailer, a bale is lifted by a forklift truck or similar means onto the support frame 14 in the position of FIG. 3, that is, in the locked position. When a bale is to be unloaded, the latch pin 66 or 87 is withdrawn and the bale pushed to rotate the carrier frame and roll the bale off the frame and the carrier. It is possible to place two frames 12 side by side on a truck or trailer, with the latches on the internal edges of the frames. Bales can be loaded from either side, and by attaching short lengths of rope to the arms 56 and 90, the latches can be controlled from one side while the bales roll off the other side.

The particular details of construction and dimensions of the trailer frame 12 can be varied by choice and would normally include a tongue 20 and ball hitch 28. There also would be support members 21, 22, and 23 for example. Also there would be provided a swing down jack 24 and screw handle 26 etc. for maintaining the frame of the vehicle in a horizontal plane during the loading and unloading operation. There may be more than one jack 24 as shown in dashed positions 24', for example. Also the tongue 20 can be extensible so it can be attached to a truck which may have a fork lift on the back end, etc.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A hay bale carrier comprising:
   (a) a long rectangular wheel supported body frame formed in part by two spaced paralleled longitudinal side members and means to removably attach said body frame to a vehicle;
   (b) at least one rectangular support frame having concaved transverse portions configured to receive a hay bale thereon;
   (c) at least one pair of spaced sloping transverse support members, each support member being affixed at the ends thereof perpendicularly to said longitudinal side members, and
   (d) means to rotatably support said support frame to said sloping support members about a central longitudinal axis, whereby said support frame can rotate from a horizontal position to a selected slope angle in the direction toward the lower ends of said sloping support members and one side of said frame; and
   (e) means to latch said support frame in a horizontal position.

2. The hay bale carrier as in claim 1 in which the transverse portions of said support frame are curved.

3. The hay bale carrier as in claim 1 including a plurality of support frames each rotatably supported from sloping transverse support members extending between said body frame side members.

4. The hay bale carrier as in claim 1 in which said support frame comprises two longitudinal members, the member on the side toward the lower ends of sloping support members being stronger than the member on the opposite side,
   whereby in loading and unloading it supports the full weight of said bales.

* * * * *